United States Patent
Jung et al.

(10) Patent No.: US 8,863,919 B2
(45) Date of Patent: Oct. 21, 2014

(54) ELECTRIC PARKING BRAKE SYSTEM

(75) Inventors: Yu Don Jung, Seoul (KR); Chang Bok Ko, Gyunngi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 222 days.

(21) Appl. No.: 13/424,016

(22) Filed: Mar. 19, 2012

(65) Prior Publication Data

US 2012/0234640 A1     Sep. 20, 2012

(30) Foreign Application Priority Data

Mar. 18, 2011 (KR) .................. 10-2011-0024190

(51) Int. Cl.
| | | |
|---|---|---|
| *F16D 51/22* | (2006.01) | |
| *B60L 7/24* | (2006.01) | |
| *F16D 51/00* | (2006.01) | |
| *F16D 65/22* | (2006.01) | |
| *F16D 65/28* | (2006.01) | |
| *F16D 125/50* | (2012.01) | |
| *F16D 125/40* | (2012.01) | |
| *F16D 125/64* | (2012.01) | |
| *F16D 121/24* | (2012.01) | |

(52) U.S. Cl.
CPC ............... B60L 7/24 (2013.01); *F16D 2125/50* (2013.01); *F16D 2125/40* (2013.01); *F16D 2125/64* (2013.01); F16D 51/22 (2013.01); *F16D 2121/24* (2013.01); F16D 51/00 (2013.01); F16D 65/22 (2013.01); F16D 65/28 (2013.01)
USPC .......................................... 188/325; 188/156

(58) Field of Classification Search
CPC ............ F16D 2125/20; F16D 2125/40; F16D 2125/64; F16D 65/22; F16D 2121/24
USPC .................................. 188/325–326, 330–332
See application file for complete search history.

(56) References Cited

U.S. PATENT DOCUMENTS 2,475,504 A * 7/1949 Jackson ..................... 475/179
5,310,026 A * 5/1994 Shaw et al. .................. 188/156
(Continued)

FOREIGN PATENT DOCUMENTS

| GB | 2162602 A * | 2/1986 |
|---|---|---|
| JP | 06-050394 A | 2/1994 |
| JP | 2003-028215 A | 1/2003 |
| JP | 2007-003004 A | 1/2007 |
| KR | 10-0582446 B1 | 5/2006 |
| KR | 10-2007-0062765 A | 6/2007 |

OTHER PUBLICATIONS

Korean Office Action issued in Korean Patent Application No. KR 10-2011-0024190 dated Sep. 25, 2012.

(Continued)

*Primary Examiner* — Anna Momper
(74) *Attorney, Agent, or Firm* — McDermott Will & Emery LLP

(57) ABSTRACT

Disclosed is a motor driven type electric parking brake system. The parking brake system includes a drum that is rotated along with a wheel, first and second brake shoes installed in the drum to apply brake force to the drum, an operating lever that supports the two brake shoes and pushes the two brake shoes against an inner surface of the drum when a pivoting lever is pulled, a motor to generate drive power to drive the pivoting lever, a cycloid speed reducer connected to a rotating shaft of the motor to amplify the drive power, a spindle member rotatably connected to the speed reducer and having a male screw portion, and a nut member having a female screw portion reciprocally screwed to the male screw portion. The nut member is moved in a longitudinal direction of the spindle member and supports an end of the pivoting lever.

10 Claims, 7 Drawing Sheets

(56) References Cited

U.S. PATENT DOCUMENTS

| | | | | |
|---|---|---|---|---|
| 5,312,305 A | * | 5/1994 | Palau | 475/162 |
| 6,018,223 A | * | 1/2000 | Oruganty et al. | 318/10 |
| 2008/0035433 A1 | * | 2/2008 | Strand et al. | 188/72.4 |

OTHER PUBLICATIONS

Chinese Office Action issued in Chinese Patent Application No. CN 201210072977.5 dated Dec. 23, 2013.

* cited by examiner

-Prior Artized system which is mounted to a vehicle and is operated by a motor.

ELECTRIC PARKING BRAKE SYSTEM

CROSS-REFERENCE TO RELATED APPLICATION

This application claims the benefit of Korean Patent Application No. 2011-0024190, filed on Mar. 18, 2011 in the Korean Intellectual Property Office, the disclosure of which is incorporated herein by reference.

BACKGROUND

1. Field

Embodiments of the present invention relate to an electric parking brake system which is mounted to a vehicle and is operated by a motor.

2. Description of the Related Art

Generally, a parking brake system is a system to stop a vehicle so as not to move when parking the vehicle. The parking brake system serves to catch a wheel so as to prevent rotation of the wheel.

FIG. 1 is a sectional view illustrating a partial configuration of a vehicle having a conventional manual parking brake system.

Referring to FIG. 1, the conventional manual parking brake system includes a drum 1 which is rotated along with a vehicle wheel, and a first brake shoe 2 and a second brake shoe 3 which are mounted within the drum 1 and apply brake force to the drum 1 via friction with an inner surface of the drum 1. Additionally, an operating lever 5 is provided in the drum 1. The operating lever 5 pushes the two brake shoes 2 and 3 against the inner surface of the drum 1 when a parking cable 4, connected to a parking lever provided at the driver's seat, is pulled.

The first and second brake shoes 2 and 3 respectively include rims 2a and 3a, which are bent in a semicircular form to correspond to the inner surface of the drum 1, linings 2b and 3b attached to outer surfaces of the rims 2a and 3a via friction with the inner surface of the drum 1, and webs 2c and 3c coupled to inner surfaces of the rims 2a and 3a to reinforce the rims 2a and 3a.

The operating lever 5 includes a support lever 6, a pressure member 7, and a pivoting lever 8. The support lever 6 has one end to support the web 2c of the first brake shoe 2, and the other end of the support lever 6 is extended toward the second brake shoe 3. The pressure member 7 is coupled to the support lever 6 so as to be reciprocally movable in a longitudinal direction of the support lever 6. One end of the pressure member 7 is supported by the web 3c of the second brake shoe 3. The pivoting lever 8 is pivotally coupled to the support lever 6. The pivoting lever 8 is pivoted when the parking cable 4 is pulled, thereby acting to push the pressure member 7.

One end of the pivoting lever 8 is pivotally coupled to the support lever 6 via a pivot shaft 8a, and the other end of the pivoting lever 8 penetrates a back-plate 10 to protrude outward. An end of the pivoting lever 8 protruding outward of the back-plate 10 is provided with a hook 8b such that the parking cable 4 is caught by the hook 8b to thereby be connected to the pivoting lever 8.

The other end of the pressure member 7 comes into contact with the pivoting lever 8 and contact portions of the pressure member 7 and the pivoting lever 8 have a concavely curved surface form.

In operation of the above described parking brake system, when the parking cable 4 connected to a parking lever (not shown) of the driver's seat is pulled, the pivoting lever 8 is pivoted in a direction designated by the arrow A about the pivot shaft 8a, so that the curved surface portion of the pivoting lever 8 applies pressure to the curved surface portion of the pressure member 7. Thereby, the pressure member 7 acts to push the web 3c of the second brake shoe 3 against the inner surface of the drum 1. At the same time, the support lever 6 is advanced toward the first brake shoe 2 by reaction acting on the support lever 6, thereby pushing the web 2c of the first brake shoe 2. As a result, the two brake shoes 2 and 3 come into close contact with the inner surface of the drum 1, thereby applying brake force to the drum 1.

Meanwhile, not-described reference numeral '9' is a return spring that returns the two brake shoes 2 and 3 to their original positions when the brake force is removed.

In the case of the above described conventional parking brake system, the pivoting lever 8 is rotated when the parking cable 4 is pulled and pressure is applied to the second brake shoe 3 via rotation of the pivoting lever 8. Therefore, as the second brake shoe 3 pushes the pivoting lever 8 in a rotating direction thereof, the second brake shoe 3 is moved in a braking direction, thereby generating brake force.

However, the above described conventional parking brake system requires a driver to inconveniently pull the parking lever with appropriate force. Further, the parking lever has a large operating radius, which may deteriorate use of the interior space of a vehicle.

In consideration of the aforementioned inconvenience of the manual parking brake system, an electric parking brake system to automatically operate a brake using a motor has been proposed. Recently, a variety of research and development to achieve utility of an installation space, enhanced operating performance, operating noise reduction, and the like has been conducted.

SUMMARY

Therefore, it is an aspect of the present invention to provide an electric parking brake system which provides improved configuration of respective components, such as a motor to generate drive power, a gear to transmit the drive power, and screw and nut members to change rotation into rectilinear movement as well as a connection configuration between the components, thereby ensuring more efficient operation thereof.

Additional aspects of the invention will be set forth in part in the description which follows and, in part, will be obvious from the description, or may be learned by practice of the invention.

In accordance with one aspect of the present invention, an electric parking brake system including a drum that is rotated along with a vehicle wheel, first and second brake shoes installed in both sides of the drum to apply brake force to the drum, and an operating lever that supports the two brake shoes and pushes the two brake shoes against an inner surface of the drum when a pivoting lever is pulled, includes a motor to generate drive power required to drive the pivoting lever, a cycloid speed reducer connected to a rotating shaft of the motor to amplify the drive power, a spindle member rotatably connected to the cycloid speed reducer, the spindle member having a male screw portion, and a nut member having a female screw portion screwed to the male screw portion of the spindle member in a rectilinear reciprocal manner, wherein the nut member is moved in a longitudinal direction of the spindle member and supports an end of the pivoting lever.

The pivoting lever may have a hook formed at the end of the pivoting lever, and a lever pin may be rotatably installed to the hook and comes into contact with the nut member.

The nut member may have a predetermined length, and the nut member may be provided at one end thereof with a coupling hole in which the female screw portion screwed to the male screw portion of the spindle member is formed, and the other end of the nut member may come into contact with the lever pin and is provided with an inclined portion.

A support pin may further be provided at an upper end of the inclined portion and stably supports the lever pin.

The cycloid speed reducer may include an eccentric rotator connected to the rotating shaft of the motor to eccentrically transmit rotation, a cycloid gear, at the center of which the eccentric rotator is installed, the cycloid gear having a plurality of through-holes radially arranged about the center thereof and being eccentrically rotated by the eccentric rotator, an internal gear engaged with an outer circumferential surface of the cycloid gear to perform revolution and rotation of the cycloid gear via rotation of the rotating shaft, and output eccentric shafts respectively inserted into the plurality of through-holes to compensate for the eccentric center of the cycloid gear.

The internal gear may be fixed to the motor so as not to be rotated, and a bearing may be installed between the cycloid gear and the eccentric rotator.

The spindle member may include a spindle shaft having a predetermined length and provided at an outer circumferential surface thereof with the male screw portion, and a flange radially protruding from one end of the spindle shaft, and the flange may be provided with insertion holes at positions corresponding to the through-holes so that the output eccentric shafts are inserted into the insertion holes.

Each of the output eccentric shafts may include a circular plate taking the form of a cylinder having a large diameter, and a cylindrical pin eccentrically formed at one end of the circular plate and having a smaller diameter than the circular plate, and the circular plate eccentrically formed relative to the pin may be inserted into the through-hole of the cycloid gear, and the pin may be fixedly coupled to the insertion hole of the spindle member that is located in front of the pin.

Each of the output eccentric shafts may take the form of a cylinder having a predetermined length, one end of which is fixedly coupled to the insertion hole and the other end of which is inserted into the through-hole.

The spindle shaft may be provided at the other end thereof with a polygonal connecting shaft, and the polygonal connecting shaft may protrude outward from the male screw portion to allow the spindle shaft to be manually rotated.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
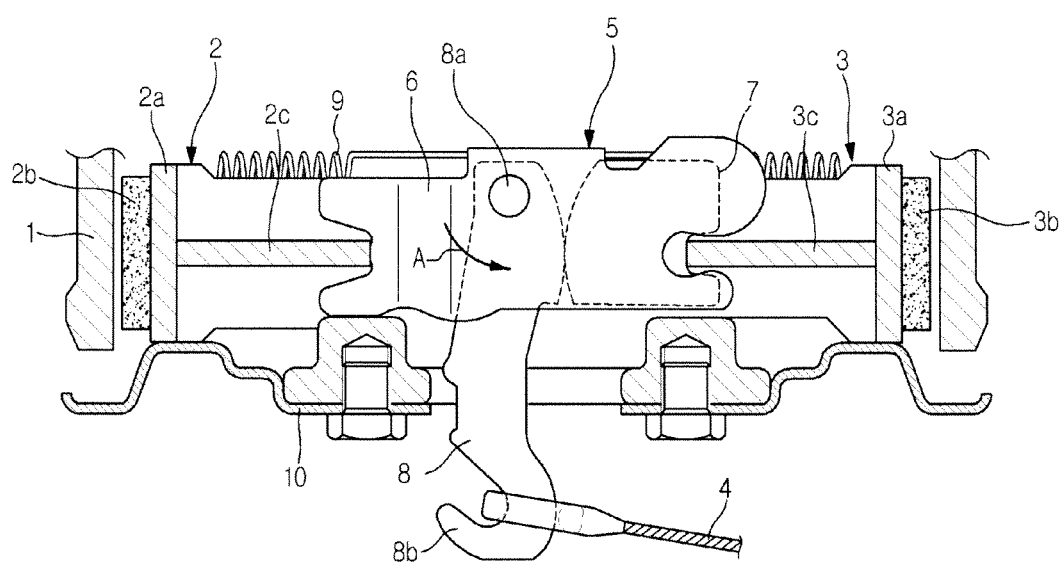
FIG. 1 is a sectional view schematically illustrating a configuration of a conventional parking brake system.

Reference will now be made in detail to the embodiment of the present invention, examples of which are illustrated in the accompanying drawings, wherein like reference numerals refer to like elements throughout. The terms or words used in the specification and claims are not interpreted using typical or dictionary limited meanings, and are constructed as meanings and concepts conforming to the technical spirit of the embodiment based on the principle that the inventors can appropriately define the concepts of the terms to explain the embodiment in the best manner. Accordingly, it is to be understood that the detailed description, which will be disclosed along with the accompanying drawings, is intended to describe the exemplary embodiment and is not intended to represent all technical ideas of the embodiment. Therefore, it should be understood that various equivalents and modifications can exist which can replace the embodiments described in the time of the application.

Figure 2:
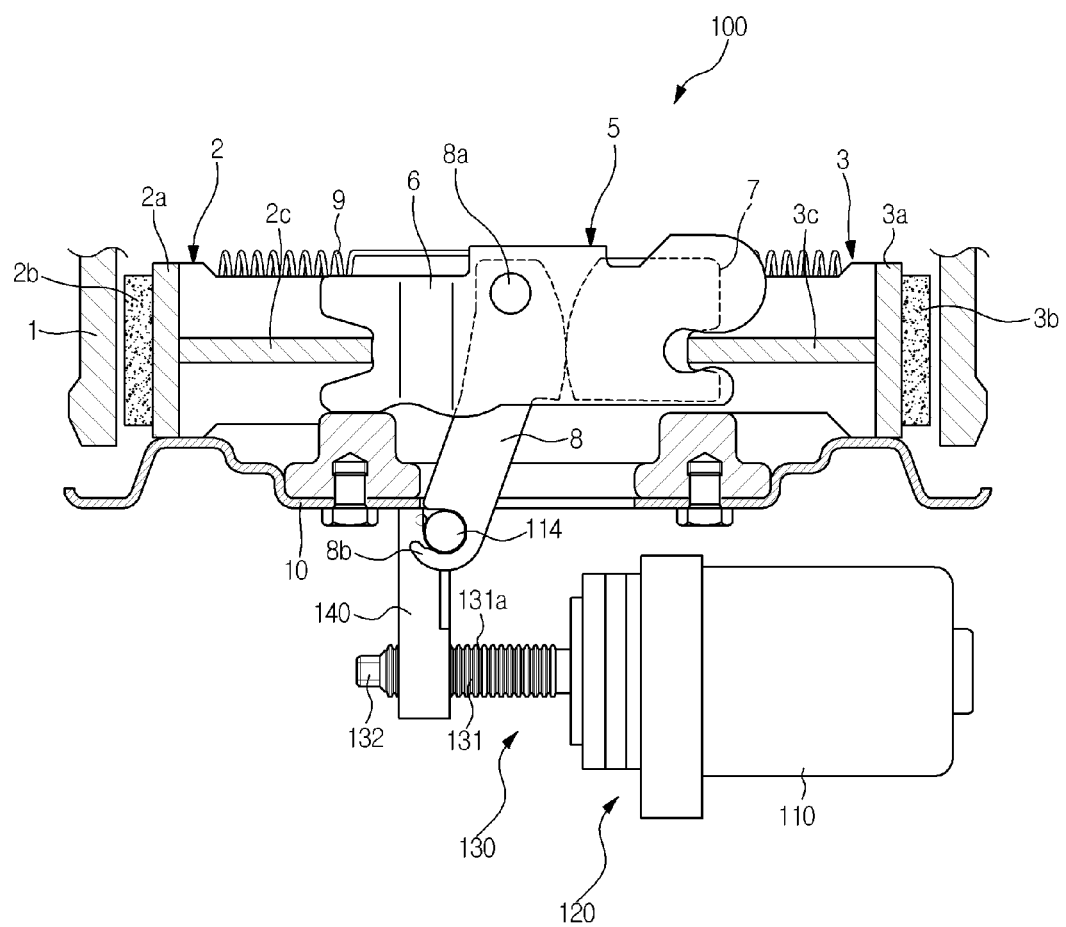
FIG. 2 is a sectional view schematically illustrating a configuration of an electric parking brake system according to an embodiment of the present invention.

FIG. 2 is a sectional view schematically illustrating a configuration of an electric parking brake system according to an embodiment of the present invention. Here, the same reference numerals as those in the drawing of the previously described conventional parking brake system designate members having the same function.

As illustrated in FIG. 2, the electric parking brake system 100 according to the embodiment includes the drum 1 which is rotated along with a vehicle wheel (not shown), the first brake shoe 2 and second brake shoe 3 which are mounted within the drum 1 to apply brake force to the drum 1 via friction with an inner surface of the drum 1, the operating lever 5 to push the two brake shoes 2 and 3 against the inner surface of the drum 1 when the pivoting lever 8 is pulled, an actuator unit including a motor 110 to generate drive power required to drive the pivoting lever 8, a speed reducer 120 connected to the motor 110, and a spindle member 130 that is rotated upon receiving the drive power amplified by the speed reducer 120, and a nut member 140 that converts rotation of the actuator unit into rectilinear reciprocation to move the pivoting lever 8.

The operating lever 5, used to generate brake force by pushing the first and second brake shoes 2 and 3 against the inner surface of the drum 1, has the same configuration and operation as the related art, and thus a detailed description thereof will hereinafter be omitted.

Figure 3:
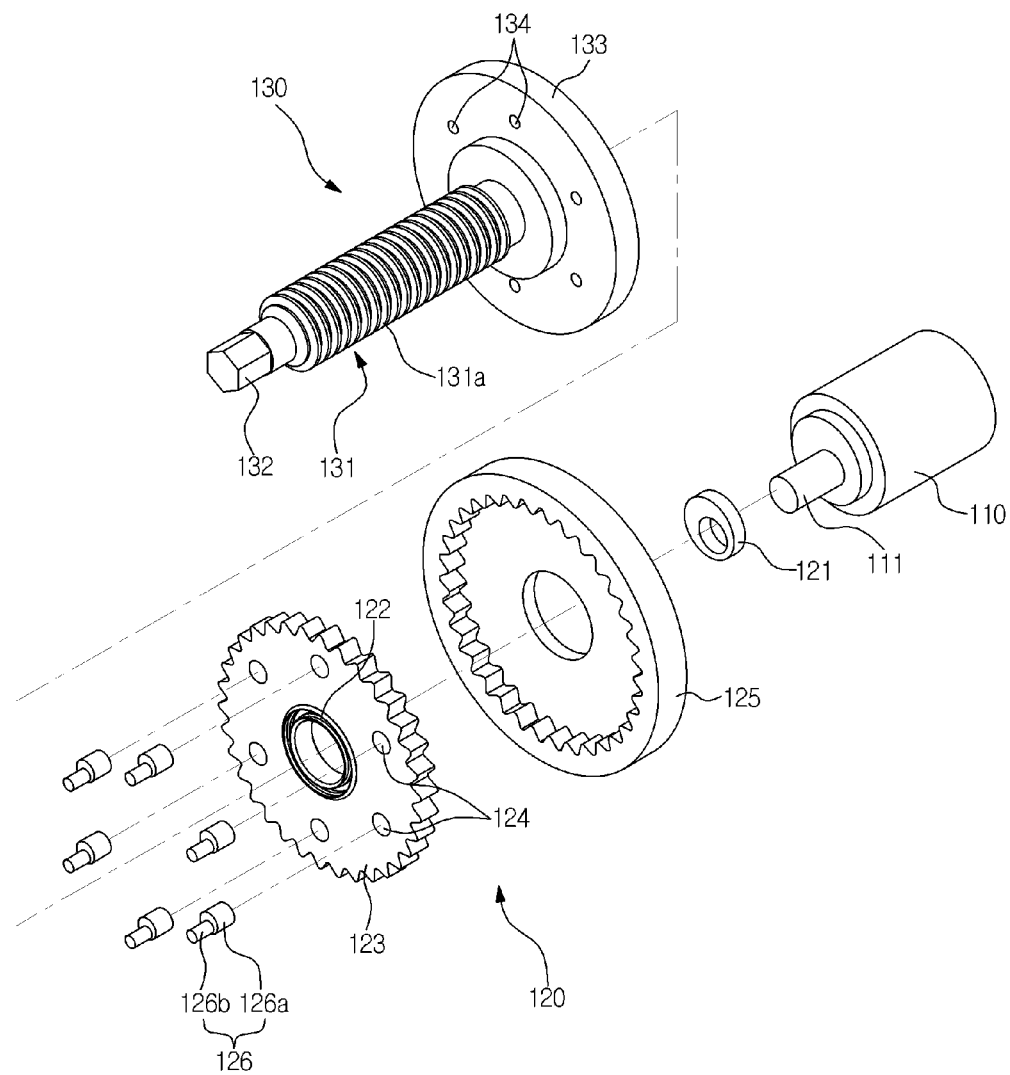
FIG. 3 is an exploded perspective view illustrating an actuator provided in the electric parking brake system according to the embodiment of the present invention.
Figure 4:
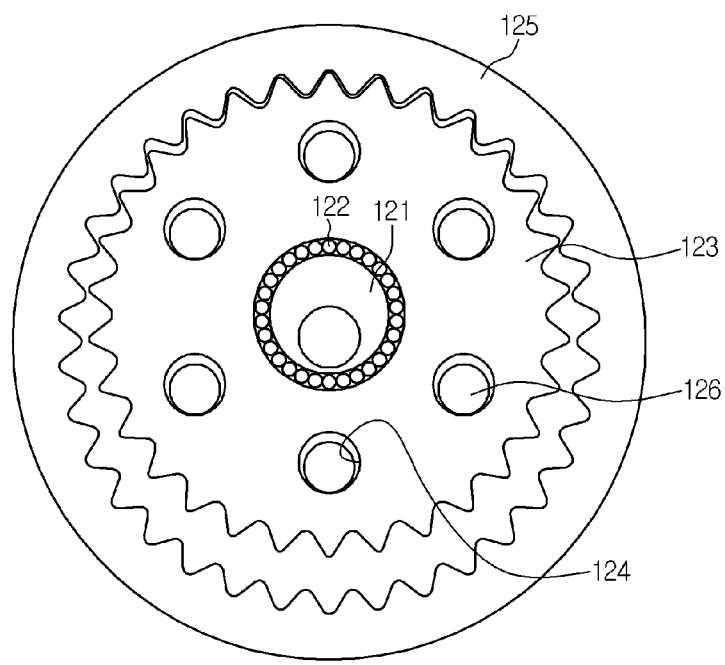
FIG. 4 is a front view illustrating a cycloidal speed reducer provided in the electric parking brake system according to the embodiment of the present invention.
Figure 5:
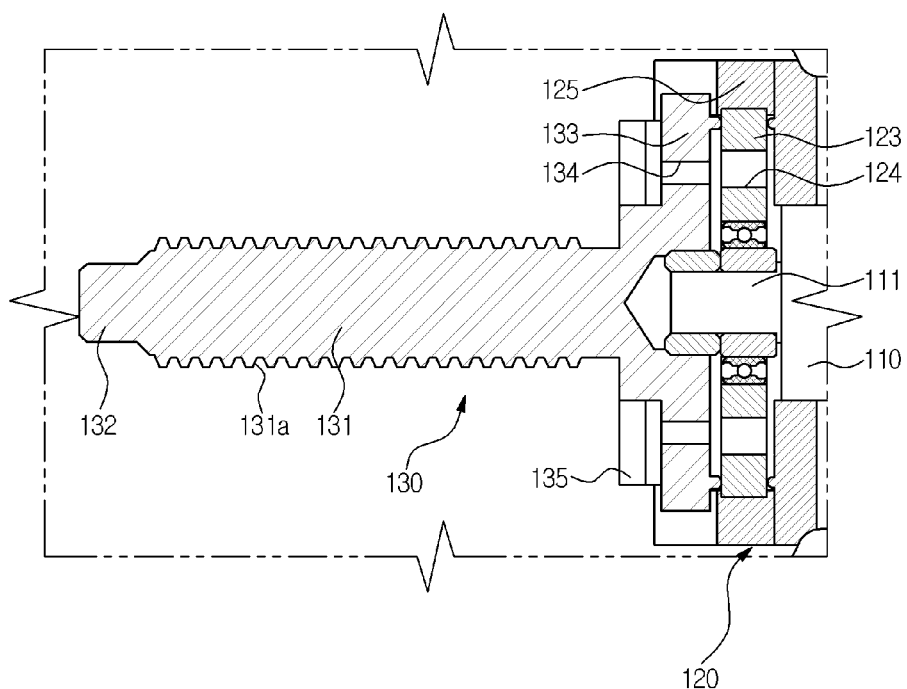
FIG. 5 is a sectional view illustrating an assembled state of FIG. 3.

The actuator unit, as described above, includes the motor 110, the speed reducer 120 connected to the motor 110, and the spindle member 130 connected to the speed reducer 120. The actuator unit is illustrated in FIGS. 3 to 5.

Referring to the drawings, the motor 110 includes a rotating shaft 111 and generates drive power required to drive the pivoting lever 8. In this case, the pivoting lever 8, as illustrated, has one end penetrating the back-plate 10 to protrude outward. The end of the pivoting lever 8, protruding outward of the back-plate 10, is provided with the hook 8b such that a lever pin 114 that will be described hereinafter may be rotatably caught by the loop 8b.

Meanwhile, the motor 110 is connected to a controller (not shown) that controls the motor 110 and is operated under control of the controller. For example, the controller controls various operations of the motor 110, such as operation and stop, and forward or reverse rotation of the motor 110, in response to input signals transmitted according to a driver command. If the driver applies a brake operating command or a brake release command, the motor 110 is rotated forward or reverse under control of the controller. Further, the controller includes a load sensor (not shown) to detect the magnitude of force applied to the pivoting lever 8. If it is judged based on signals output from the load sensor that the magnitude of force applied to the pivoting lever 8 exceeds a predetermined value, the controller may stop the motor 110.

The speed reducer 120 is connected to the rotating shaft 111 and serves to amplify drive power. The speed reducer according to the embodiment is a cycloid speed reducer 120. Hereinafter, the reducer is referred to as the cycloid speed reducer 120.

The cycloid speed reducer 120 includes an eccentric rotator 121 coupled to the rotating shaft 111 of the motor 110 to perform eccentric rotation, a cycloid gear 123 which is eccentrically rotated by the eccentric rotator 121, an internal gear 125 engaged with an outer circumferential surface of the cycloid gear 123 to enable rotation of the cycloid gear 123, and output eccentric shafts 126 inserted respectively into a plurality of through-holes 124 perforated in the cycloid gear 123.

The eccentric rotator 121 has a hole eccentrically positioned relative to the center thereof, into which the rotating shaft 111 of the motor 110 is fitted to enable eccentric rotation of the eccentric rotator 121.

The eccentric rotator 121 is installed in the center of the cycloid gear 123 to eccentrically rotate the cycloid gear 123. In this case, the eccentric rotator 121 is connected to the cycloid gear 123 via a bearing 122. That is, the bearing 122 is interposed between the cycloid gear 123 and the eccentric rotator 121.

The cycloid gear 123 has the plurality of through-holes 124 radially arranged about the center thereof. As illustrated, the cycloid gear 123 may have six through-holes 124 arranged at a constant interval. The number of the through-holes 124 may be selectively increased or decreased based on capacity. The output eccentric shafts 126 are inserted into the through-holes 124. The output eccentric shafts 126 allow the cycloid gear 123 to have the same eccentricity as the eccentric rotator 121, which may compensate for the eccentric center of the cycloid gear 123.

The internal gear 125 has the same cycloid curve as teeth of the cycloid gear 123 so as to be engaged with the outer circumferential surface of the cycloid gear 123. The internal gear 125 is fixed to the motor 110 so as to perform revolution and rotation during eccentric rotation of the cycloid gear 123.

Each output eccentric shaft 126 includes a circular plate 126a taking the form of a cylinder having a large diameter, and a cylindrical pin 126b formed at one end of the circular plate 126a, the cylindrical pin 126b having a smaller diameter than that of the circular plate 126a.

The output eccentric shaft 126 is configured such that the pin 126b is eccentric to the circular plate 126a. The circular plate 126a is rotatably inserted into the through-hole 124 of the cycloid gear 123, and the pin 126b is fixedly inserted into an insertion hole 134 of the spindle member 130 that will be described hereinafter.

Although not illustrated, the output eccentric shaft 126 may be a cylindrical member having a predetermined length. Specifically, the output eccentric shaft 126 may take the form of a linear cylinder, one end of which is inserted into the insertion hole 134 and the other end of which is inserted into the through-hole 124. In this case, a diameter of the output eccentric shaft 126 is less than a diameter of the through-hole 124.

The output eccentric shaft 126 having the above-described configuration may be integrally coupled to the insertion hole 134 of the spindle member 130.

In operation of the cycloid speed reducer 120 according to the present embodiment, if the eccentric rotator 121 connected to the rotating shaft 111 of the motor 110 is rotated, the cycloid gear 123 connected to the eccentric rotator 121 via the bearing 122 rotates according to a difference between the number of teeth of the cycloid gear 123 and the number of teeth of the internal gear 125 while performing revolution inside the internal gear 125.

For example, if the cycloid gear 123 is rotated clockwise about the eccentric rotator 121, the cycloid gear 123 is also rotated counterclockwise along an inner circumferential surface of the internal gear 125 due to the fact that the cycloid gear 123 is engaged with the internal gear 125.

That is, rotational momentum of the cycloid gear 123 corresponds to reduced output torque to be transmitted to the spindle member 130. Thus, the output eccentric shafts 126 inserted into the through-holes 124 of the cycloid gear 123 serve to eliminate revolution shaking of the cycloid gear 123, which assists the spindle member 130 in rotating about the same axis as the rotating shaft 111 of the motor 110. Specifically, as the output eccentric shafts 126 synchronize torque transmission from the eccentrically rotating cycloid gear 123 with revolution of the cycloid gear 123, the spindle member 130 is rotated about the same axis as the rotating shaft 111 of the motor 110 upon receiving the torque.

According to the embodiment, through the above described configuration of the cycloid speed reducer 120, a higher output torque may be achieved owing to a significantly higher contact ratio of the gears than that in a conventional planetary gear assembly or spur gear assembly. Further, as compared to the planetary gear assembly, the cycloid speed reducer 120 has a reduction in thickness and the number of gear elements, which may reduce the overall length of an actuator.

The spindle member 130 includes a spindle shaft 131 having a predetermined length, a connecting shaft 132 protruding from one end of the spindle shaft 131, and a flange 133 radially protruding from the other end of the spindle shaft 131.

The spindle shaft 131 is provided at an outer circumferential surface thereof with a male screw portion 131a, which is screwed to a female screw portion 141a formed at a coupling hole 141 of the nut member 140 that will be described hereinafter. Thus, as the spindle shaft 131 is rotated, the nut member 140 is moved in a longitudinal direction of the spindle shaft 131.

The connecting shaft 132 is used to assist the spindle shaft 131 in being manually rotated using a separate tool for removal of brake force in the event of emergency, i.e. if the motor 110 has difficulty in generating brake force. The connecting shaft 132 may have a hexagonal cross section. Of course, the connecting shaft 132 may have various other polygonal cross sections, such as triangular and square cross sections, so long as it may be rotatably fitted into a separate tool.

The flange 133 is directly coupled to the cycloid speed reducer 120. The flange 133 is provided with the insertion holes 134 at positions corresponding to the through-holes 124 and is coupled to the cycloid gear 123 via the output eccentric shafts 126. More specifically, the pins 126b of the output eccentric shafts 126 are fixedly coupled to the insertion holes 134 of the flange 133. With this connection, as described above, since the output eccentric shafts 126 synchronize torque transmission from the eccentrically rotating cycloid gear 123 with revolution of the cycloid gear 123, the spindle member 130 may be rotated about the same axis as the rotating shaft 111 of the motor 110 upon receiving rotating force.

Meanwhile, not-described reference numeral '135' (see FIG. 5) designates a cover to prevent the spindle member 130 from being separated from the cycloid gear 123 once the spindle member 130 has been coupled to the cycloid gear 123.

Figure 6:
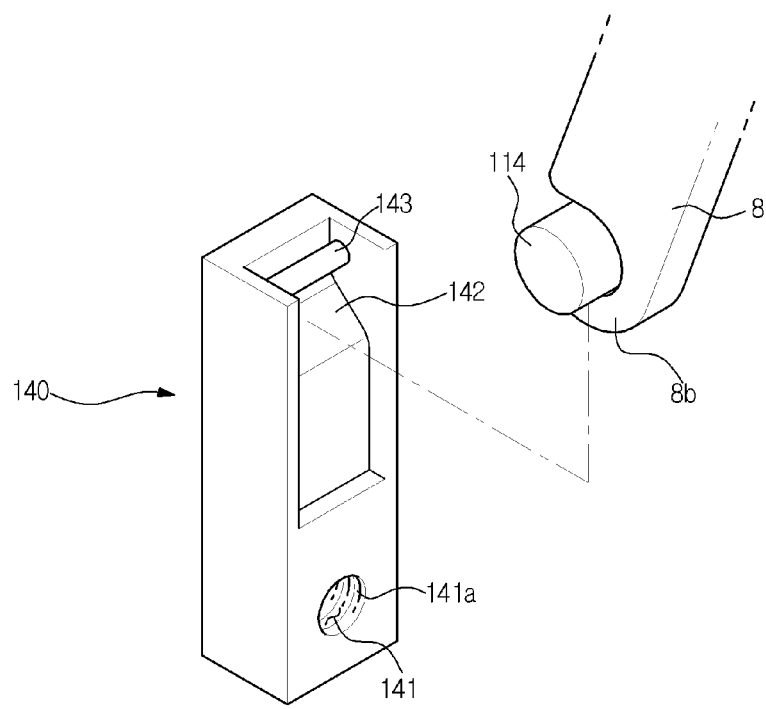
FIG. 6 is a partial perspective view illustrating a coupled state of a nut member and a pivoting lever provided in the electric parking brake system according to the embodiment of the present invention.

The nut member 140 is moved in a longitudinal direction of the spindle member 130 and is configured to support the end of the pivoting lever 8. The nut member 140, as illustrated in FIG. 6, is provided at one end thereof with the coupling hole 141, and the coupling hole 141 is provided with the female screw portion 141a screwed to the male screw portion 131a in a rectilinear reciprocal manner. The other end of the nut member 140 comes into contact with the lever pin 114 installed to the hook 8b of the pivoting lever 8 to support the lever pin 114. In this case, the other end coming into contact with the lever pin 114 is provided with an inclined portion 142. The inclined portion 142 serves to reduce an initial operating time upon braking. That is, the lever pin 114 rotatably installed to the pivoting lever 8 slides along the inclined portion 142 with minimal friction, thereby being pressed by the nut member 140 along with the pivoting lever 8. In this case, the inclined portion 142 of the nut member 140 is further provided at an upper end thereof with a support pin 143 to stably support the lever pin 114.

Now, braking operation of the above-described electric parking brake system will be described.

Figure 7:
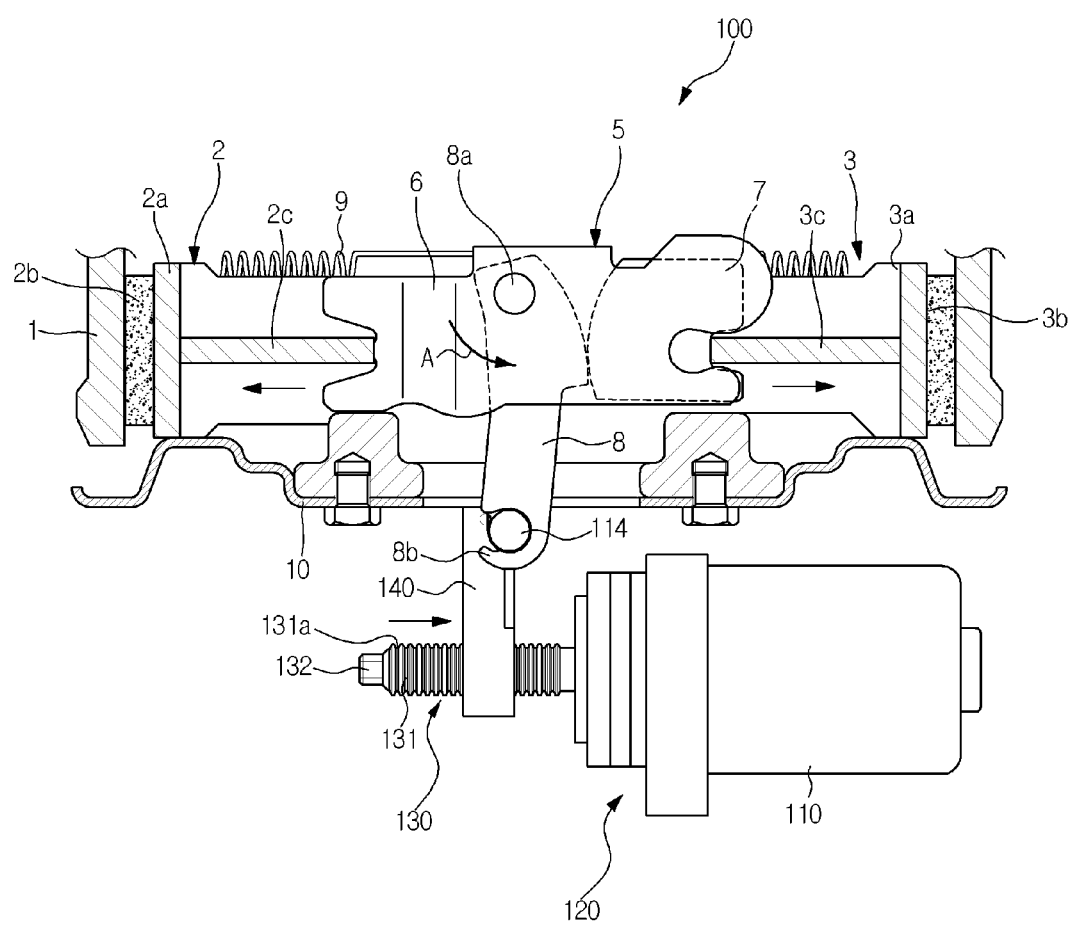
FIG. 7 is a sectional view illustrating a braking operation of the electric parking brake system according to the embodiment of the present invention.

As illustrated in FIG. 2, if the driver of the vehicle pushes the controller (not shown), e.g., a parking switch (not shown) in a state in which the two brake shoes 2 and 3 are spaced apart from the inner surface of the drum 1 (i.e. in a braking release state), the motor 110 is rotated upon receiving a control signal to generate drive power. The cycloid speed reducer 120 is eccentrically rotated to cause speed reduction upon receiving the drive power of the motor 110, and transmits torque to the spindle member 130 connected to the cycloid speed reducer 120. Thus, if the nut member 140 reciprocally coupled to the spindle member 130 is moved to apply pressure to the pivoting lever 8, as illustrated in FIG. 7, the pivoting lever 8 is rotated in a direction designated by the arrow A about the pivot shaft 8a.

Through rotation of the pivoting lever 8, the curved surface portion of the pivoting lever 8 applies pressure to the curved surface portion of the pressure member 7, thereby causing the pressure member 7 to push the web 3c of the second brake shoe 3 against the inner surface of the drum 1. At the same time, the support lever 6 is advanced toward the first brake shoe 2 by reaction acting on the support lever 6 so as to push the web 2c of the first brake shoe 2, whereby brake force is generated.

On the other hand, when the brake force is removed, the spindle member 130 is rotated in an opposite direction to that upon braking, causing the nut member 140 to move to an original position thereof. Thereby, the two brake shoes 2 and 3 are spaced apart from the inner surface of the drum 1 by elasticity of the return spring 9, thereby being returned to original positions thereof.

As is apparent from the above description, an electric parking brake system according to the embodiment may realize not only convenient braking using a motor, but also improved space utilization by reducing a space occupied by a conventional parking lever.

Further, as a result of using a cycloid speed reducer and directly coupling a spindle member to the speed reducer in series, the overall length of an actuator to generate brake force may be minimized, resulting in a compact coupling configuration and improved space utilization.

Furthermore, through use of a nut member having an inclined portion, it may be possible to reduce an initial operating time, and the cycloid speed reducer may achieve fast speed reduction and the length thereof may be minimized.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric parking brake system comprising:
    a drum (1) that s rotated along with a vehicle wheel;
    first and second brake shoes (2 and 3) installed in both sides of the drum to apply brake force to the drum;
    an operating lever (5) that supports the two brake shoes and pushes the two brake shoes against an inner surface of the drum when a pivoting lever (8) is pulled;
    a motor (110) to generate drive power required to drive the pivoting lever;
    a cycloid speed reducer (120) connected to a rotating shaft (111) of the motor to amplify the drive power;
    a spindle member (130) rotatably connected to the cycloid speed reducer, the spindle member having a male screw portion (131a); and
    a nut member (140) having a coupling hole at one end thereof in which a female screw portion (141a) is screwed to the male screw portion of the spindle member in a rectilinear reciprocal manner and the other end of the nut member comes into contact with a lever pin and is provided with an inclined portion,
    wherein the nut member is moved in a longitudinal direction of the spindle member and supports an end of the pivoting lever, and
    the lever pin rotatably installed to the pivoting lever slides along the inclined portion.

2. The electric parking brake system according to claim 1, wherein the pivoting lever has a hook (8b) formed at the end of the pivoting lever, and the lever pin (114) is rotatably installed to the hook and comes into contact with the nut member.

3. The electric parking brake system according to claim 1, wherein a support pin (143) is further provided at an upper end of the inclined portion and stably supports the lever pin.

4. The electric parking brake system according to claim 1, wherein the cycloid speed reducer includes:
    an eccentric rotator (121) connected to the rotating shaft of the motor to eccentrically transmit rotation;
    a cycloid gear (123), at the center of which the eccentric rotator is installed, the cycloid gear having a plurality of through-holes (124) radially arranged about the center thereof and being eccentrically rotated by the eccentric rotator;
    an internal gear (125) engaged with an outer circumferential surface of the cycloid gear to perform revolution and rotation of the cycloid gear via rotation of the rotating shaft; and
    output eccentric shafts (126) respectively inserted into the plurality of through-holes to compensate for the eccentric center of the cycloid gear.

5. The electric parking brake system according to claim 4, wherein the internal gear is fixed to the motor so as not to be rotated.

6. The electric parking brake system according to claim 4, wherein a bearing (122) is installed between the cycloid gear and the eccentric rotator.

7. The electric parking brake system according to claim 4, wherein the spindle member includes:
- a spindle shaft (131) having a predetermined length and provided at an outer circumferential surface thereof with the male screw portion; and
- a flange (133) radially protruding from one end of the spindle shaft, and
- wherein the flange is provided with insertion holes (134) at positions corresponding to the through-holes so that the output eccentric shafts are inserted into the insertion holes.

8. The electric parking brake system according to claim 7, wherein each of the output eccentric shafts includes:
- a circular plate (126a) taking the form of a cylinder having a large diameter; and
- a cylindrical pin (126b) eccentrically formed at one end of the circular plate and having a smaller diameter than the circular plate, and
- wherein the circular plate eccentrically formed relative to the pin is inserted into the through-hole of the cycloid gear, and the pin is fixedly coupled to the insertion hole of the spindle member that is located in front of the pin.

9. The electric parking brake system according to claim 7, wherein each of the output eccentric shafts takes the form of a cylinder having a predetermined length, one end of which is fixedly coupled to the insertion hole and the other end of which is inserted into the through-hole.

10. The electric parking brake system according to claim 7, wherein the spindle shaft is provided at the other end thereof with a polygonal connecting shaft (132), and the polygonal connecting shaft protrudes outward from the male screw portion to allow the spindle shaft to be manually rotated.

* * * * *